US012733649B2

(12) United States Patent
Hepworth et al.

(10) Patent No.: US 12,733,649 B2
(45) Date of Patent: Sep. 15, 2026

(54) METHOD FOR REPLACING EGGS IN COMPOSITIONS

(71) Applicant: CELLUCOMP LIMITED, Fife (GB)

(72) Inventors: David Hepworth, Fife (GB); Eric Whale, Fife (GB); Phillip Duggan, Fife (GB); Robyn Plaice-Inglis, Fife (GB)

(73) Assignee: CELLUCOMP LIMITED, Fife (GB)

( * ) Notice: Subject to any disclaimer, the term of this patent is extended or adjusted under 35 U.S.C. 154(b) by 844 days.

(21) Appl. No.: 17/311,436

(22) PCT Filed: Dec. 6, 2019

(86) PCT No.: PCT/EP2019/084099
§ 371 (c)(1),
(2) Date: Jun. 7, 2021

(87) PCT Pub. No.: WO2020/115325
PCT Pub. Date: Jun. 11, 2020

(65) Prior Publication Data

US 2022/0022467 A1 Jan. 27, 2022

(30) Foreign Application Priority Data

Dec. 6, 2018 (GB) ..................................... 1819921
Dec. 6, 2018 (GB) ..................................... 1819923

(51) Int. Cl.

| | |
|---|---|
| ***A21D 2/18*** | (2006.01) |
| ***A21D 10/00*** | (2006.01) |
| ***A21D 13/062*** | (2017.01) |
| ***A21D 13/066*** | (2017.01) |
| ***A21D 13/068*** | (2017.01) |
| ***A23G 1/40*** | (2006.01) |
| ***A23L 15/00*** | (2016.01) |
| ***A23L 23/00*** | (2016.01) |
| ***A23L 33/24*** | (2016.01) |

(52) U.S. Cl.
CPC ........... *A21D 2/188* (2013.01); *A21D 10/005* (2013.01); *A21D 13/062* (2013.01); *A21D 13/066* (2013.01); *A21D 13/068* (2013.01); *A23G 1/40* (2013.01); *A23L 15/35* (2016.08); *A23L 23/00* (2016.08); *A23L 33/24* (2016.08); *A23V 2002/00* (2013.01)

(58) Field of Classification Search
CPC .... A21D 2/188; A21D 13/062; A21D 13/068; A21D 15/35; A21D 33/24; A23L 33/24; A23L 13/062; A23L 15/35
See application file for complete search history.

(56) References Cited

U.S. PATENT DOCUMENTS

| | | | | |
|---|---|---|---|---|
| 5,589,215 | A | 12/1996 | Tang | |
| 6,495,190 | B1 * | 12/2002 | Yaginuma ................ | C08L 5/00 426/573 |
| 2005/0274469 | A1 | 12/2005 | Lundberg et al. | |
| 2006/0093720 | A1 | 5/2006 | Tatz | |
| 2006/0289132 | A1 | 12/2006 | Heijnesson-Hulten | |
| 2008/0128606 | A1 | 6/2008 | Grant et al. | |
| 2012/0121758 | A1 | 5/2012 | Becker | |
| 2013/0068943 | A1 | 3/2013 | Heaven | |
| 2015/0337493 | A1 | 11/2015 | Heiskanen et al. | |
| 2016/0168274 | A1 * | 6/2016 | Hepworth .............. | A23L 33/24 536/56 |

FOREIGN PATENT DOCUMENTS

| | | | |
|---|---|---|---|
| BR | PI0703471 | A2 | 9/2010 |
| CN | 102484030 | A | 5/2012 |
| CN | 106035453 | A | 10/2016 |
| CN | 107427742 | A | 12/2017 |
| EP | 2377992 | A1 | 10/2011 |
| EP | 2392215 | A1 | 12/2011 |
| EP | 2773223 | A1 | 9/2014 |
| GB | 2551709 | A | 1/2018 |

(Continued)

OTHER PUBLICATIONS

Karppinen, "Water Holding Capacity—How cellulose fibrils does it". Available online as of Dec. 12, 2017 from https://blog.borregaard.com/exilva/water-holding-capacity-how-microfibrillated-cellulose-does-it. pp. 1-4. (Year: 2017).*

International Search Report from corresponding PCT Application No. PCT/EP2019/084099, dated Mar. 11, 2020.

Food Products—Simple Cellulose: An Ingredient for Clean Eating, Aug. 20, 2018.

Simple Cellulose in Action, Wayback Machine, Oct. 24, 2018.

Niamh Michail, Renmatix on its multifunctional simple cellulose: 'This is a new-to-the-world ingredient', Jul. 24, 2018.

UK Search Report from corresponding GB Patent Application No. GB1819921.6, dated May 16, 2019.

UK Search Report from corresponding GB Patent Application No. GB1819923.2, dated May 16, 2019.

(Continued)

*Primary Examiner* — Jenna A Watts
(74) *Attorney, Agent, or Firm* — Harness, Dickey & Pierce, P.L.C.

(57) ABSTRACT

A method for replacing eggs and/or egg materials, particularly egg yolks, and/or for replacing a significant proportion of its fat and/or sugar content in a food composition, the method comprising the step of providing, in the food product, cellulose-containing particles that are derived from a herbaceous plant and that comprise: less than 30 wt % extractable glucose; and extractable xylose in an amount of at least 3% of the amount of extractable xylose in the plant. The replacement method involves providing, in the composition, cellulose-containing particles made from a herbaceous plant material by a process of: i) comminuting the plant material to form particles of the plant having a mean major dimension of less than 10 mm, preferably less than 100 μm, ii) then treating the plant particles from i) with a peroxide and water, iii) then heating the peroxide-treated plant particles from ii), and iv) then isolating the cellulose-containing particles.

6 Claims, No Drawings

(56) References Cited

FOREIGN PATENT DOCUMENTS

| | | | |
|---|---|---|---|
| JP | 2018-186771 | A | 11/2018 |
| TW | 201231136 | A | 8/2012 |
| WO | WO-2013/067453 | A1 | 5/2013 |
| WO | WO-2013/188657 | A1 | 12/2013 |
| WO | WO-2014/147392 | A1 | 9/2014 |
| WO | WO-2014/147393 | A1 | 9/2014 |
| WO | WO-2015/007953 | A1 | 1/2015 |
| WO | WO-2016/001635 | A1 | 1/2016 |
| WO | WO-2017/014806 | A1 | 1/2017 |
| WO | WO-2017/014967 | A1 | 1/2017 |
| WO | WO-2017/220777 | A1 | 12/2017 |

OTHER PUBLICATIONS

Rossmann, J., et al.; "Evaluation of the matrix effect of different sample matrices for 33 pharmaceuticals by post-column infusion", Journal of Chromatography B, 1000 (2015) 84-94.

Gonzalez, O., et al.; Matrix Effect Compensation in Small-Molecule Profiling for an LCTOF Platform Using Multicomponent Postcolumn Infusion, Analytical Chemistry, 2015, 87, 5921-5929.

Xie, J-S., et al.; "Matrix effects in bioanalysis by LC/MS", Chin J Pharm Anal 2008, 28 (8), 1386-1389.

Office Action from corresponding Chinese Patent Application No. 2019800833177, dated Aug. 16, 2023.

Office Action from corresponding Chinese Patent Application No. 201980089110.0, dated Sep. 27, 2023.

* cited by examiner

METHOD FOR REPLACING EGGS IN COMPOSITIONS

CROSS-REFERENCE TO RELATED APPLICATIONS

This application is a national phase application of PCT Application No. PCT/EP2019/084099, filed on 6 Dec. 2019, which claims benefit of United Kingdom Patent Application Nos. 1819921.6, filed on 6 Dec. 2018 and 1819923.2, filed on 6 Dec. 2018. The entire disclosure of the applications identified in this paragraph are incorporated herein by references.

TECHNICAL FIELD

The present invention relates to a method for replacing eggs and/or replacing a significant portion of their fat and/or sugar contents in compositions, particularly liquid compositions or bakery products, with cellulose-containing particles. The present invention also relates to egg-free compositions, particularly food and drink composition (e.g., gravies and custards), made by the method and to the use of egg-free compositions made by the method. The present invention also relates to a method for reducing fat and/or sugar in bakery products by the replacement of a significant portion of their fat and/or sugar contents with increased amounts of other ingredients of the bakery products. The present invention also relates to bakery products, such as bread, biscuits, pastries, muffins and cakes and their leavened dough or batter compositions. In particular, the method involves the use of cellulose-containing particles from a herbaceous plant material to enable such replacement.

BACKGROUND OF THE INVENTION

Numerous methods have been known for making microfibrillated cellulose and nano-fibrillated cellulose. Typically, such processes have involved extracting cellulose from a plant material such as wood or cotton. Some processes have relied upon mechanical processing alone, whilst other processes use a combination of chemical and/or enzymatic treatment, together with mechanical processing. Examples of mechanical processing have included US 2015/0337493 which describes extraction of cellulose by mechanically fibrillating a pulp, and US 2005/0274469 which describes the application of high shear to pre-soaked cellulosic material followed by fluid bed drying or flash drying. Examples of chemical/enzyme treatment(s) with mechanical processing have included US 2006/0289132 which describes the use of an oxidant and a transition metal in an aqueous suspension of the starting material pulp followed by mechanical delamination, WO 2015/007953 which describes adding an oxidant to an aqueous pulp suspension followed by mechanical mixing or shearing of the suspension, and WO 2013/188657 which describes treating an aqueous slurry of a plant material with ozone and/or a cellulase whilst concurrently or subsequently comminuting the material.

WO 2014/147392 and WO 2014/147393 have described making cellulose-containing particles from herbaceous plant materials by shredding or chopping and optionally homogenizing the plant material, when wet, to have a mean major dimension of less than 10 mm, preferably less than 500 μm, then treating the plant material with a peroxide and then heating it. Various advantageous uses for the resulting cellulose-containing particles have been described, including: as a rheology modifier, as a viscosity improver, as a strengthening agent, in concrete, in a coating composition, in a food composition, in a cosmetic and in paper. In this regard, the particles have been added to food compositions as a stabiliser, emulsifier or thickener, to modify the viscosity of and/or stabilize food compositions, such as animal feed compositions, baby food compositions. These food compositions have included emulsions, beverages, sauces, soups, syrups, dressings, films, dairy and non-dairy milks and products, frozen desserts, cultured foods, bakery fillings, and bakery cream. Such food compositions have typically included diverse edible material and additives, including proteins, fruit or vegetable juices, fruit or vegetable pulps, fruit-flavoured substances, as well as mineral salts, protein sources, acidulants, sweeteners, buffering agents, pH modifiers, stabilizing salts, additional flavourings, colourings, preservatives, pH buffers, nutritional supplements, process aids, and the like. Examples of such food compositions have included dry mix products (such as instant sauces, gravies, soups, instant cocoa drinks, etc.), low pH dairy products (such as sour creams/yogurts, yogurt drinks, stabilized frozen yogurts, etc.) and baked goods. In spite of these attempts to prepare such food products, and particularly reduced-fat or substantially fat-free food products, prepared with these and other celluloses have often proved unsatisfactory. In general, as the fat content of a given food product is reduced, more cellulose-containing or gelating ingredients must be added. Unfortunately, as increasing quantities of conventional cellulose ingredients are added to food, the adverse organoleptic effects of these agents become more pronounced. Depending on the food product, these adverse effects can include undesirable mouth coating and drying sensations, chalky, astringent or other disagreeable flavours, difficulty in forming dispersions or emulsions, instability, adverse texture and consistency, and a general lack of the well-known organoleptic properties typically associated with conventional foods. As a result, food products utilizing conventional cellulose based ingredients have many of the negative organoleptic properties described above.

Recently, WO2017220777 (A1) has described an improved process for preparing cellulose-containing particles from a herbaceous plant material by:

a) comminuting the herbaceous plant material, in a dry state, to form particles of the plant material with an average particle diameter of from 10 μm to 800 μm;
b) contacting the particles of plant material with a peroxide reagent and water;
c) allowing the peroxide-treated particles in the mixture from step b) to hydrate, preferably with heating, until the pH of the mixture is pH 4.5 or less; and then
d) homogenising the mixture from step c) and isolating the cellulose-containing particles.

Various advantageous uses for the hydrated cellulose-containing particles, made by this process, have been described, including: in food and drink applications, personal care products, paint systems, concretes, drilling muds, epoxies and the like. In particular, the particles have been used in food and drink products where rheological modification can be of benefit. Such products include any which are processed in the form of a slurry, suspension or liquid, such as dairy products (e.g., milk products, yoghurts, creams, custards, ice creams or other frozen desserts, and the like), processed fruit products (e.g., smoothies, pie fillings, jams or sauces), sauces, gravies, mayonnaise etc. The particles can also be of particular benefit in baked products, in particular in gluten-free products such as gluten free breads, cakes and biscuits.

Additionally, the particles can be of benefit to at least partially replace fats in high fat foodstuffs (e.g. in chocolate, puddings and desserts) by providing a smoother mouth-feel with a lower fat content than would otherwise be acceptable, and/or to increase the dietary fibre content of foodstuffs, such as in products formed using refined flours (e.g., in pastas, noodles, breads, biscuits, cakes and pastries).

However, because of the wide variety of known cellulose-containing particles and the wide variety of uses thereof which are known, alternative cellulose-containing particles and new uses thereof have continued to be sought. Moreover, manufacturers of bakery products have continually sought new ways for reducing the fat and sugar content and thereby the caloric content of their bakery products.

SUMMARY OF THE INVENTION

In a first aspect, the present invention provides a method for replacing eggs and/or egg materials, particularly egg yolks, in a composition, preferably a liquid composition, which would otherwise contain egg materials, particularly egg yolks, the replacement method comprising the step of providing, in the composition that is substantially, preferably completely, free of eggs or egg materials, cellulose-containing particles that are derived from a herbaceous plants. Preferably, these are derived from sugar beet, and more preferably comprise less than 30 wt % extractable glucose; and extractable xylose in an amount of at least 3% of the amount of extractable xylose in the plant. In a second aspect, the present invention provides a method for reducing the fat and/or sugar content in a bakery product by replacing a significant proportion of its fat and/or sugar content with an increased proportion of other ingredients of the bakery product, the reducing method comprising the step of providing, in the bakery product, cellulose-containing particles that are derived from a herbaceous plant, preferably derived from sugar beet, and more preferably comprising less than 30 wt % extractable glucose; and extractable xylose in an amount of at least 3% of the amount of extractable xylose in the plant and that comprise less than 30 wt % extractable glucose; and extractable xylose in an amount of at least 3% of the amount of extractable xylose in the plant. The method is preferably also allows to reduce other components, such as starch and additives such as emulfisiers.

Preferably, the cellulose-containing particles are made by a process, as described in WO2016001635A1, comprising the steps of:

(i) contacting the herbaceous plant material with a peroxide reagent and water; and/or
(ii) heating the mixture from step (i) to a temperature of from 30 to 110° C. and maintaining the mixture at a temperature of from 30 to 110° C. until the pH of the mixture has dropped by at least 2 pH units; and then
(iii) isolating the cellulose-containing particles from the mixture of step (ii).

A further preferred process to prepare the cellulose-containing particles from herbaceous plant material, comprising:

(a) contacting the herbaceous plant biomass with an enzyme composition comprising at least one endo-glucanase; and one or more polysaccharide hydrolases selected from endo-polygalacturonase, arabinofuranosidase pectin lyase, pectate lyase, pectin methyl esterase, endo-arabinanase, endo-galactanase, galactosidase, rhamnogalacturonan hydrolase, rhamnogalacturonan lyase, or xylanase to form an enzyme-treated biomass; and
(b) isolating the cellulose-containing particles from the mixture of step (ii).

More preferably, the cellulose-containing particles are made by comminuting the herbaceous plant material to form particles of the plant material having a mean major dimension of less than 10 μm, preferably less than 100 μm, more preferably less than 250 μm, most preferably less than 500 μm before being contacted in step (i) with the peroxide reagent and water.

Still more preferably, the cellulose-containing particles may be made by a process as described in WO2017/220777, comprising the steps of:

(i) comminuting the herbaceous plant material in a dry condition to form particles of the plant material with an average particle diameter of from 10 μm to 800 μm, preferably 100 μm to 300 μm, more preferably 100 μm to 200 μm, most preferably between 75 μm and 150 μm;
(ii) then treating the plant particles from step (i) with the peroxide reagent and water;
(iii) then allowing the peroxide-treated plant particles in the mixture from step (ii) to hydrate, preferably with heating, until the pH of the mixture is pH 4.5 or less;
(iv) then homogenising the hydrated plant particles in the mixture from step (iii); and
(v) then isolating the cellulose-containing particles from the mixture from step (iv).

A further preferred process may comprise the steps of (i) comminuting the herbaceous plant material in a dry condition to form particles of the plant material with an average particle diameter of from 10 μm to 800 μm, preferably 100 μm to 300 μm, more preferably 100 μm to 200 μm, most preferably between 75 μm and 150 μm; and
(ii) contacting the particles of the plant materia obtain in (i) with an enzyme composition comprising at least one endo-glucanase; and one or more polysaccharide hydrolases selected from endo-polygalacturonase, arabinofuranosidase pectin lyase, pectate lyase, pectin methyl esterase, endo-arabinanase, endo-galactanase, galactosidase, rhamnogalacturonan hydrolase, rhamnogalacturonan lyase, or xylanase to form an enzyme-treated biomass; and
(iii) isolating the cellulose-containing particles from the mixture of step (ii).

Preferably, the cellulose-containing particles may be used as a replacement for eggs and/or egg materials in this method, provide substantially the same or better viscosity and/or rheological characteristics as would the replaced eggs and/or egg materials.

Without wishing to be bound to any particular theory, it is considered that the particles are able to stabilize particles in an aqueous emulsion or dispersion, thereby maintaining the structure of the emulsion or dispersion for a suitably long period of time to arrive at a final product that still has the same structure, and thereby translating into good baked properties such as the correct crumb structure and air pocket distribution for baked goods, or correct mouthfeel for liquid products.

In a second aspect, the present invention provides a composition, preferably a liquid composition, more preferably a food or drink composition, that is substantially, preferably completely, free of eggs and/or egg materials, and that comprises, as a replacement for eggs and/or egg materials, the cellulose-containing particles of the first aspect of the invention. Preferably, the cellulose-containing particles in the composition provide substantially the same or better viscosity and/or rheological characteristics to the composition as would the replaced eggs and egg materials.

In a third aspect, the present invention provides the use of the composition, preferably a liquid composition, that is substantially, preferably completely, free of eggs and egg materials of the second aspect of the invention. Preferably, the cellulose-containing particles, in the use of the composition, provide substantially the same or better viscosity and/or rheological characteristics as would the replaced eggs and/or egg materials.

In a further aspect, the present invention provides a bakery product that has a substantially reduced proportion of fat and/or sugar and that comprises the cellulose-containing particles of the first aspect of the invention and the increased proportion of other ingredients of the bakery product of the first aspect of the invention. Preferably, the cellulose-containing particles in the bakery product enable the increased proportion of other ingredients of the bakery product to provide the same or better viscosity and/or rheological characteristics to the bakery product as compared to the corresponding bakery product without the reduced fat and/or sugar.

In a further aspect, the present invention provides the use of the bakery product of the second aspect of the invention that has the substantially reduced proportion of fat and/or sugar. Preferably, the cellulose-containing particles, in the use of the bakery product, enable the increased proportion of other ingredients of the bakery product to provide the same or better viscosity and/or rheological characteristics to the bakery product as compared to the corresponding bakery product without the reduced fat and/or sugar.

In a further aspect, the present invention also relates to a chemically or yeast leavened dough or batter made by a process comprising: adding an effective amount of cellulose-containing particles derived from a herbaceous plant, preferably sugar beet, and more preferably comprise less than 30 wt % extractable glucose; and extractable xylose in an amount of at least 3% of the amount of extractable xylose in the plant, to dry ingredients or a dough or batter made by blending a liquid with the dry ingredients, further comprising at least one leavening factor in any suitable order to prepare the leavened dough or batter, preferably, wherein the particles are present in an amount of from 0.1 to 10% by weight on total dough or batter weight.

In a further aspect, the present invention also relates to a process for preparing a leavened dough or batter comprising: adding an effective amount of cellulose-containing particles derived from a herbaceous plant, preferably sugar beet, and more preferably comprise less than 30 wt % extractable glucose; and extractable xylose in an amount of at least 3% of the amount of extractable xylose in the plant, to dry ingredients or a dough or batter made by blending a liquid with the dry ingredients, further comprising at least one leavening factor in any suitable order to prepare the leavened dough or batter. Preferably, the process further comprises shaping the dough or batter into suitable shape and/or portions, and subjecting the shaped dough or batter to a baking process, to obtain a bakery product.

In a further aspect, the present invention also relates to the dough or batter, whether fresh or deep frozen, and to dry mixes for preparation of the dough or batter, as well as the bakery products thus obtained.

DETAILED DESCRIPTION OF THE INVENTION

As used herein, the term "plant material" preferably means a herbaceous plant material. The term "plant material" can also mean a mixture of materials from different herbaceous plants. For example, the plant material can comprise a mixture of different root vegetables, a mixture of different fruits, a combination of fruit and vegetable(s), including a mixture of root vegetables together with a mixture of fruits. Preferably, the term "plant material" will not include plant materials containing significant quantity of lignin.

As also used herein, the term "herbaceous plant" preferably means a plant which is an annual, biennial or perennial vascular plant but can also mean mosses, charophycean green algae and macro algae (brown seaweed). Herbaceous plants are generally characterised by parenchymal tissue having an abundance of primary cell walls within the tissue. Preferably, the herbaceous plant material used in the process of the present invention is a vegetable, for example a root vegetable, such as carrots, sugar beets (also commonly referenced as "beet"), turnip, parsnips and swedes, or a fruit, such as apples, pears, citrus and grapes. Optionally, the herbaceous plant material can be from tubers, such as potatoes, sweet potatoes, yams, rutabayas and yucca roots.

As also used herein, the term "liquid composition" preferably means a product which is processed in the form of a slurry, suspension or fluid, such as dairy products (e.g., milk products, yoghurts, creams, custards and ice creams), processed fruit products (e.g., smoothies, pie fillings and jams), sauces, gravies, mayonnaise and the like.

As also used herein, the terms "replace", "replacement" and "replacing", with reference to "eggs" or "egg materials", preferably mean substituting certain cellulose-containing particles for all or part of the "eggs" or "egg materials", particularly to modify the viscosity and/or rheology of liquids, in the replacement method, in the composition free of eggs and egg materials and in the use of the composition of the present invention. As also used herein, terms such as "reduce" and "reduction", with reference to "fat and/or sugar", preferably mean the use of certain cellulose-containing particles to enable a significant amount of the "fat and/or sugar" content of a bakery product to be replaced by an increased amount of other ingredients in the bakery product. In this regard, the term "significant proportion" preferably means at least a 10%, more preferably at least a 20%, yet more preferably 20% to 30%, of the "fat and/or sugar" content of a bakery product which is to be replaced (and thereby reduced) by an increased proportion of other ingredients in accordance with this invention.

As also used herein, the term "bakery product" relates to bakery product such as chemically or yeast leavened breads, their dough or batter compositions, and other related bakery products, such as biscuits, muffins, cakes and pastries. More specifically, this invention relates to chemically leavened bread and related bakery products, which are leavened with carbon dioxide from a chemical source such as a carbonate factor.

As also used herein, the term "dry ingredients" refers to a mixture of ingredients such as flour and other ingredients, without any leavening system and which can be used to make a dough or batter. Typically, this mix is dry or substantially dry. A leavening system is one whose principal function is to supply carbon dioxide or other leavening gas for leavening. Various flours may be employed in this invention. Those of skill in the art will appreciate that both quality and quantity of protein are important in the selection of the flour and the amount of flour employed.

As also used herein, each of the terms "dough" and "batter" refers to a cohesive blend of dry ingredients, optionally containing one or more ingredients of a leavening system, with a liquid binder. The liquid binder is typically water although various other liquids can be employed, such as vegetable oils, mixtures thereof and the like.

As also used herein, the term "fat" preferably means an oil that is conventionally used in baking, such as olive oil, sunflower oil, rapeseed oil, etc. but can also mean a lipid that is solid at room temperature, such e.g. as butter, coconut fat, rendering or the like.

As also used herein, the term "comminute", with reference to a herbaceous plant material, preferably means chopped and/or shredded and/or homogenized, more preferably chopped or shredded and homogenized.

As also used herein, the terms "eggs" and "egg materials" preferably mean respectively eggs from a bird or reptile and the contents of eggs which consists of a protective eggshell, albumen (egg white), and vitellus (egg yolk), contained within various a thin membrane.

The present cellulose-derived materials may advantageously be used as a fat substitute, replacement or extender, thickening agent, yield stress enhancer, stabilizer, film-former or binding agent in foods, including but not limited to, low moisture food products, including nut pastes such as peanut butter, confectionery spreads such as cookie fillings, chocolate sauce, and other compound confectionery coatings, confectionery fillings or spreads such as nougat, caramel, truffle, fudges; confectionery and bakery icings and glazes, creme fillings, snack spreads and fillings, and the like; dairy products, milk based products or substitutes therefore, including cream substitutes, stabilized forms of steamed milk or substitutes therefore, frozen snacks such as ice cream, frozen yogurt, soft-serve or hard-packed frozen desserts, ice milk, butter, margarine, sour cream, yogurt, and the like; salad dressings; and cream or soups and sauces such as custards.

Preferably, the herbaceous plant material, used as the starting material in the processes for making the cellulose-containing particles that are used in the replacement method of the present invention, will not contain a significant quantity of lignin. Preferably, this plant material contains less than about 20 wt % lignin, more preferably less than about 10 wt % lignin, more preferably less than 2 wt % lignin. The herbaceous plant material can be a raw plant material, i.e. uncooked. It is however desirable that this plant material has been washed, for example to remove any non-plant material debris or contaminants. The plant material, used as the starting material, should be dry and preferably contain less than 30 wt % water, more preferably less than 20 wt % water, still more preferably less than 15 wt % water. Water is of course naturally present as part of the plant cell wall; so even apparently very desiccated material may include some water content.

The following is a description of the steps of the preferred process, particularly its steps (i) to (iv), for making the cellulose-containing particles that are used in the replacement method of the present invention.

Comminuting the Plant Material to Form Plant Particles

The plant particles can be formed in step (i) using any conventional process, such as shredding and/or chopping and/or homogenizing, for comminuting the herbaceous plant material. Preferably for step (i) of the preferred process, the plant material is comminuted, preferably by grinding or milling (e.g., with a classifier mill), in the absence of a liquid, particularly water. In this regard, neither water nor any other liquid is added to the plant material prior to its comminution to form the plant particles, and the plant material is not in the form of a slurry or suspension during the comminution step. If desired, the plant material can be dried (e.g. at ambient temperature or at higher temperatures) before being comminuted. The comminuted material can be screened to select plant particles of the desired size.

The plant particles, made by comminuting the herbaceous plant material preferably have a mean average diameter of from 10 μm to 800 μm. The terms "dimension" and "diameter" refer to measurements across the plant particles from one side to the other side. One skilled in the art would recognise the particles would not be perfectly spherical, but may be near-spherical, ellipsoid, disc-shaped, or even of irregular shape. One skilled in the art would also be aware that a range of dimensions and diameters would be present within the particles. To obtain the benefits of the present invention, it is not necessary to meticulously exclude very small quantities of particles which fall outside the stated particle diameter size. However, inclusion of particles of significantly different dimensions and diameters can, in some circumstances, adversely affect the quality of the end product.

Optionally, at least 60% by volume of the comminuted plant particles, made in step (i) of the preferred process have a diameter of from 10 μm to 800 μm, for example at least 70% by volume of the particles have a diameter of from 10 μm to 800 μm, or at least 80% by volume of the particles have a diameter of from 10 μm to 800 μm, or at least 85% by volume of the particles have a diameter of from 10 μm to 800 μm, or at least 90% by volume of the particles have a diameter of from 10 μm to 800 μm, or at least 95% by volume of the particles have a diameter of from 10 μm to 800 μm, or even at least 98% by volume of the particles have a diameter of from 10 μm to 800 μm. Conveniently 99% by volume of the particles have a diameter of from 10 μm to 800 μm. In some circumstances it may be advantageous to ensure that substantially all of the particles have a diameter of from 10 μm to 800 μm.

Treating the Plant Particles with a Peroxide and Water

The comminuted plant particles can be treated with a peroxide reagent and water in any conventional manner in step (ii) of the preferred process. In this regard, it is not essential for the peroxide reagent to be added simultaneously with the water. However, it is often convenient to add the water and peroxide reagent simultaneously. For example, it is possible to premix the peroxide reagent with the water and then to add the water-peroxide reagent mixture to the plant material particles. Alternatively, it is possible to add water to the particles of plant material to form an aqueous slurry, and then to add the peroxide reagent to the slurry. Preferably, addition of the water and/or peroxide reagent is accompanied by stirring of the resultant mixture to facilitate formation of a homogenous composition.

The volume of water to be added to the peroxide is not critical but can typically be from 2 litres to 30 litres water per kg plant material particles. This is in addition to any solution of peroxide reagent which may additionally be added. One of the benefits of the present invention is the relatively high percentage of solids which can be present within the mixture after the addition of water and peroxide reagent. In some embodiments, the mixture formed in this step (ii)) can contain more than 2 wt % solids. In some embodiments, the mixture formed in step (ii) can contain at least 3 wt % solids, for example at least 4 wt % solids or at least 5 wt % solids.

The peroxide reagent breaks down the plant particles and aids in release of the cellulose-containing material end product. The peroxide reagent can be an organic peroxide or an inorganic peroxide. Exemplary organic peroxides include peroxycarboxylicacids (such as peracetic acid and peroxybenzoicacids, e.g. m-chloroperoxybenzoicacid) and hydroperoxides, including alkyl hydroperoxidesand acyl hydroperoxides (such as benzoylperoxide). Exemplary inorganic peroxides include acid peroxides (such as peroxysulphuricacid and peroxyphosphoric acid) and peroxides of the alkali and alkaline earth metal peroxides (such as sodium peroxide and barium peroxide). Hydrogen peroxide is preferred. In one embodiment, hydrogen peroxide in a concentration of 35% (w/w in water) is added in a ratio of from 0.1:1 to 0.5:1 of peroxide: plant solids.

Although a catalyst is not essential, it may be desirable in some circumstances to include a catalyst for this peroxide treatment. Suitable catalysts include transition metal catalysts, for example manganese catalysts.

Allowing the Peroxide-Treated Plant Particles to Hydrate Until the pH of the Mixture is pH 4.5 or Less In carrying out the hydration in step (iii) of the preferred process, the peroxide-treated plant particles from step (ii) are allowed to hydrate for a period of time sufficient until the pH of the particle-containing mixture is measured to be pH 4.5 or lower, preferably less than pH 4.5. Immediately after addition of the water and peroxide reagent, the pH of the mixture as measured at this point is significantly higher, typically approximately pH 6 to pH 7. The period of time required to reach the required degree of hydration (as determined by an endpoint pH of 4.5 or lower) can vary with parameters such as: particle size, temperature (both ambient temperature and/or the temperature of the slurry), concentration of peroxide reagent and the like. It has been noted that the hydration step proceeds more quickly with increased temperature and it may be beneficial to pre-heat the water (for example to temperatures of from 30 to 100° C., for example 60 to 90° C.) prior to its addition to the particulate plant material.

In carrying out this hydration, the mixture containing the peroxide-treated plant particles from step (ii) is preferably heated for part or all of the time needed to reach the end point pH. Heating can be advantageously accompanied by gentle stirring or agitation of the mixture to ensure that the temperature is reasonably consistent throughout the whole mixture volume, such as in conventional reaction vessels. Suitable agitation can be achieved by causing the mixture to flow along a pipe or other conduit. Heating can be accomplished in any conventional manner but preferably by passing the mixture from step (ii) through a pipe which has a heating apparatus around its external circumference. Suitable heating apparatuses include conventional thermal heating elements and/or a microwave apparatus which is focused onto the pipe interior. Preferably, the particle-containing mixture is heated to 30 to 110° C., more preferably 70 to 100° C., and maintained at this temperature for 1 minute to 6 hours while allowing the particles to hydrate until the pH of the mixture is pH 4.5 or less.

The time needed to reach the required end point pH can vary depending upon conditions such as particle size, temperature, degree of agitation (stirring) of the mixture and the like. Typically, the reaction time will be around 1 to 3 hours, for example 1.5 to 2.5 hours.

After hydration of the peroxide-treated plant particles, the plant particles can be washed and/or neutralized in a conventional manner. The washed and/or neutralized plant particles can then be bleached in a conventional manner. The washed and/or neutralized and/or bleached plant particles can then be washed in a conventional manner. Such washing steps can remove any excess peroxide reagent and/or bleach and also any soluble by-products from the plant particles.

Homogenising the Hydrated Plant Particles

Once step (iii) of the preferred process for making the cellulose-containing particles is complete (including any optional washing, neutralising and/or bleaching steps), the hydrated plant particles are subjected to the homogenisation step (iv). This step can be carried out in a conventional manner, such as by passing the hydrated plant particles through a conventional homogenizer, for example a Silverson FX homogenizer fitted with initially coarse stator screens and moving down to a small holed emulsifier screen (15 min process time for each screen). At this stage of the process, a rapid increase in viscosity of the plant particles is preferably obtained, such as a viscosity of 1000 cPs at 2% total concentration. The required viscosity can be obtained by controlling the extent of homogenization. The homogenisation can alternatively be conducted until the required particle size is obtained. Generally, a particle size of from 10 to 500 μm is suitable for most applications. This homogenising step can be followed by a further washing step which can be carried out as described above and/or by a heating step. Heating can be carried out in a conventional manner, such as by passing the homogenized particles through a pipe which has a heating apparatus around its external circumference. Suitable heating apparatuses include conventional thermal heating elements and/or microwave apparatuses which can heat the pipe interior to a temperature of 30 to 110° C., for example 90 to 95° C.

Isolating the Cellulose-Containing Particles

The cellulose-containing particles that are used in the replacement method of the present invention can then be separated in step (v) of the preferred process in a conventional manner. For example, separation can be by filtration (simple or vacuum filtration), centrifugation, or membrane filtration of the hydrated and homogenized, plant particles. Preferably where filtration is used during the washing step, the filter has a pore size of 200 μm or less, for example has a pore size of 100 μm to 200 μm. If desired, a smaller pore size can also be used.

Heating the Cellulose-Containing Particles

Optionally, the isolated cellulose-containing particles can then be heated. This step can be carried out as described above. The cellulose-containing particles can then be filled in a heated condition directly into packaging.

Where sugar beet as employed as a starting pant material, preferably sugar beet, and more preferably comprise less than 30 wt % extractable glucose; and extractable xylose in an amount of at least 3% of the amount of extractable xylose in the plant.

The resulting cellulose-containing particles, in particular when derived from sugar beets, preferably comprise: less than 30 wt % extractable glucose; and extractable xylose in an amount of at least 3% of the amount of extractable xylose in the starting herbaceous plant material, from which the cellulose-containing particles are made.

Preferably, the cellulose-containing particles comprise less than 80, more preferably less than 70 wt %, more preferably 65 wt %, yet more preferably more than 60 wt % cellulose. Preferably, the cellulose-containing particles have a mean major dimension of from 1 to 250 μm, more preferably 10 to 100 μm, and a water-holding capacity in the range of 90 to 99.5% by weight. Preferably, the cellulose-containing particles have a non-carbohydrate content of 20 to 75, more preferably less than 50% by dry weight.

Preferably, the cellulose-containing particles comprise at least 50% by weight of Dietary Fibre, more preferably at least 55%, yet more 60% by weight, as determined by standard method AOAC 985.29 (Total Dietary Fibre in Foods Enzymatic-Gravimetric Method), at a solids content of at least 88% by weight.

The cellulose-containing particles that are used in the replacement method of the present invention can be used in a wide variety of compositions. The compositions can be dry or substantially dry, such as pastes, and can contain varying percentages of moisture but are preferably liquid compositions, particularly food and drinks, that are free of eggs and egg materials, particularly egg yolks. The cellulose-containing particles have useful viscosity-adjusting properties and can be used to improve the rheology of liquid products, such as slurries, suspensions and solutions. Thus, the cellulose-containing particles can beneficially be added to liquid dairy products, e.g., milk products, yoghurts, creams and custards), processed fruit drinks, e.g., smoothies; sauces, gravies, mayonnaise etc. Typically, the cellulose-containing particles need only be added in surprisingly small quantities to affect significantly the physical properties of any liquid composition, into which it has been incorporated. For example, the cellulose-containing particles need only be added in an amount of up to 10 wt %, preferably up to 5 wt %, more preferably up to 2 wt %, still more preferably up to 1 wt %. In some applications the cellulose-containing particles need only be added in an amount of 0.5 wt % or less, or even 0.3 wt % or less.

The cellulose-containing particles that are used in the fat/and/or sugar reduction method of the present invention can be used in a wide variety of bakery products, such as muffins and cakes. Typically, the cellulose-containing particles need only be added in surprisingly small quantities to replace a significant portion of the fat and/or sugar content of a bakery product. For example, the cellulose-containing particles need only be added in an amount of 0.5 wt % or less, preferably 0.2 wt % or less.

The batter or dough may also contain optional ingredients such as salt, natural or artificial aroma components such as, vanillin, non-fat milk solids, flavours, colourings, etc. The combined level of these ingredients preferably will be below 15% of the batter or dough on a by weight basis, preferably below 5%.

The time of mixing the batter or dough is determined by the final consistency and other characteristics of the dough or batter that the baker desires. This information will be readily apparent to those of skill in the art especially after reading this specification. The equipment and ingredients employed will influence the length of mixing time. Once the components are blended, a baker will want to mix the dough or batter for just enough time to incorporate the cellulose particles so they are evenly or substantially evenly distributed throughout the dough or batter. The length of time of mixing for this to happen will depend to a degree on the equipment used among other variables, which is the time that gives the optimum characteristics of the dough or batter as determined by the baker.

The liquid employed in practicing this invention is preferably water or mostly water. The liquid temperature used in the mixing process of the present invention preferably should be about ambient temperature and more preferably be in the range of from about 18° C. to about 28° C. The liquid temperature should not be elevated above about 28° C. because elevated temperatures could result in decreased bakery product volume. Without being bound by theory, it is believed that the leavening components may disadvantageously react prematurely at elevated temperatures. Accordingly, the temperature should be sufficiently low so as not to cause such premature leavening, or reduction thereof. Yeast-leavened products usually require a fermentation step because yeast is a living organism which takes time to grow, reproduce, and metabolize sufficiently to produce enough $CO_2$ for leavening. By contrast, chemically-leavened systems or factors rely on a chemical reaction, which does not require such a fermentation step.

As described above, the present invention utilizes conventional equipment in the bakery process steps to make a satisfactory chemically leavened bakery product of this invention. Thus, the present invention does not require any new equipment for the conventional commercial baker. Similar to conventional bakery product processing, one of skill in the art practicing the present invention blends and mixes the ingredients to make a dough or batter. The dough or batter is formed into appropriately shaped and sized individual product portions. The shaped dough or batter is then proofed. Finally, the proofed dough or batter is heated to provide a bakery product of this invention. Heating of dough or batter made by the process of this invention for a sufficient time to a sufficient temperature to prepare a bakery product of this invention, is carried out under conditions typical for conventional bakery products.

This invention also comprises a dry mix useful to form a leavened dough or batter of this invention.

Any modifications and/or variations to described embodiments of the cellulose-containing particles that are used in the replacement method of the present invention which would be apparent to one of skill in art are hereby encompassed. Whilst the invention has been described herein with reference to certain specific embodiments and examples, it should be understood that the invention is not intended to be unduly limited to these specific embodiments or examples.

The present invention is now further described with reference to the following non-limiting examples.

Example 1—Preferred Cellulose-Containing Particles That Can be Used in the Preferred Replacement Method of the Present Invention Plant Material Processing Dried sugar beet pellets were ground into a plant powder A, B, C, or D, below (89 g, 89% solids) using a flour mill. The sugar beet powder particles were then reacted with hydrogen peroxide (40 g) in water (heated to 90° C.) in a 5 L glass reactor (total reaction mixture volume of 4000 ml), and the particles were then allowed to become hydrated. After the required pH drop or reaction time, the peroxide reaction mixture was poured through a filter mesh with 152 μm diameter holes. Samples were filtered using the mesh filter, by mixing the reaction liquid with clean water and pouring this onto a filter screen. The paste was then removed from the filter, clean water was added and then the new mixture poured back over the mesh filter. This process was repeated as required to ensure good washing.

After the hydrogen peroxide level in the washed paste had dropped to less than 1 ppm, the washed paste was diluted with water to 0.5% solids. The diluted mixture was heated to 60° C. and bleach was then added in an amount of 2:1 ratio to solids. The same filter process was applied as had been conducted after the peroxide stage and the resultant clean paste was prepared for homogenisation.

Homogenisation was carried out at 0.5% solids with a benchtop Silverson homogeniser. The volume of the homogenised solution was around 4000 ml, (adjusted as necessary to always ensure 0.5% solids). After 30 min at 7500 rpm, the resulting smooth suspension was poured gently into a filter cloth and left to drain until the solids were greater than 1%. The solids were then dried by heating to about 90° C. to produce the following plant powders A, B, C and D of preferred cellulose-containing particles which can be used in the preferred replacement method of the present invention.

Plant Powders

A. Using sugar beet powder having a particle diameter size ranging up to 800 μm, with 99.55% (by volume) of the particles having a diameter size of 500 μm or less, the peroxide reaction time was 4 hours 15 minutes, and the pH of the mixture at the end of the peroxide reaction was 3.30. The reacted mixture was filtered using a cloth filter.

B. Using sugar beet powder having a particle diameter size ranging from 75 μm to 150 μm, the reaction time was 4 hours 30 minutes, and the pH of the mixture at the end of the peroxide reaction was 3.43. The reacted mixture was filtered using a mesh filter (pore size 152 μm).

C. Using sugar beet powder having a particle diameter size ranging up to 700 μm, with 99.55% (by volume) of the particles having a diameter size of 500 μm or less, the reaction time was 2 hours, and the pH of the mixture at the end of the peroxide reaction was 3.26. The reacted mixture was filtered using a mesh filter (pore size 152 μm).

D. Using sugar beet powder with particle size greater than 150 μm (150-700). The reaction time was 3 hrs 30 min and the end pH was 3.4.

Example 2—Custard Recipe Using Preferred Cellulose-Containing Particles A to D of Example 1

In the following replacement custard recipe, egg yolks from four eggs were replaced in the following custard recipe with 100 g of the cellulose-containing particles of plant powder C, described above, which can be used in the preferred replacement method of the present invention.

TABLE

| Example 2 | | |
|---|---|---|
| | Custard Control (g) | Curran Custard Recipe (g) |
| Milk | 600 | 588 |
| Castor Sugar | 100 | 100 |
| Cornflour | 10 (2 tsp) | 10 |
| Eggs | 210 (4) | 0 |
| Curran (100% active) | 0 | 9.25 |
| Water | 0 | 212.75 |
| Vanilla Pod | 5 (1 pod) | 5 (1 pod) |

Custard recipe (Comparative): Preparation: Egg yolks were separated from egg whites which are then discarded. The sugar was then added to the egg yolks and whisked until mix pale and thick. The cornflour was added and whisked well. The milk was placed into a saucepan with vanilla pod added to the pan. The milk was heated till just below boiling point, then poured over the egg yolks and sugar mix, stirring constantly. The mix was then transferred back into a pan and then heated on a medium head while constantly stirred. This process was continued for around 10 minutes when the mix thickened.

Replacement custard recipe according to the invention: Preparation: 1% cellulose-containing particles were weighed out, and sugar was added to the cellulose-containing particles and then whisked. The cornflour was added and whisked well. The milk was placed into a saucepan with vanilla pod added to then pan. The milk was heated till just below boiling point and then poured over the cellulose-containing particles and sugar mix, stirring constantly. The liquid mixture was then transferred back into a pan and heated on a medium head while constantly stirred. This process was continued for around 10 minutes when the mixture thickens.

The custard products of the two recipes were visually examined, and viscosity tested at 100, 50, 20 and 10 RPM. The results are set forth in Table 1, below. The viscosity was substantially the same (i.e., no more than 20% higher) in the custard, in which egg yolks are replaced by the cellulose-containing particles of plant powder C, described above, as in the custard made with egg yolks. As expected, the colour was distinctly different in the custard, in which egg yolks were replaced by the cellulose-containing particles of plant powder C, described above, from the custard made with egg yolks; this was as expected due to the brownish colour of the cellulose-containing particles and the lack of egg yolks which impart a significant colour to the recipe. However, the custard recipe worked very well with the cellulose-containing particles with no apparent difference in structure of the custard product. Other than colour and a slight change in viscosity, no differences were noted.

TABLE 1

| Example 2: Viscosity Results of custards | | |
|---|---|---|
| Sample | Control | Cellulose-containing particles |
| Spindle | RV3 | RV3 |
| Temperature | 60° C. | 60° C. |
| Speed (rpm): | (Cps) | (Cps) |
| 100 | 595 | 698 |
| 50 | 850 | 970 |
| 20 | 1425 | 1680 |
| 10 | 2330 | 2850 |

The results of this Example 2 are substantially the same when the cellulose-containing particles of any of the other plant powders A, B or D is substituted for the plant powder C.

Conclusions

Viscosity and colour are the only observable differences in the experiment. The cellulose-containing particles produce a thicker custard which may be advantageous; however viscosity could be easily reduced by removal of flour, or reduction of loading of cellulose-containing particles. Colour could be altered by food colouring agent. This experiment shows that cellulose-containing particles can be a suitable egg substitute.

Example 3—Gluten Free (gf) Bread Recipe Using Preferred Cellulose-Containing Particles A to D of Example 1

In the following replacement gluten free (gf) bread recipe, egg yolks from two eggs were replaced in the following gf bread recipe with 0.3% of each of the cellulose-containing particles of plant powder C, described above, which can be used in the preferred replacement method of the present invention.

Control gf Bread Recipe 375 ml warm water; 3 tsp caster sugar; 2×7 g sachets dried yeast; 375 g gluten-free flour; 2 tsp xanthan gum; 4 tsp baking powder; ½ tsp sea salt; 1½ tsp lemon juice; 4 tbsp olive oil; 2 eggs.

Preparation: In a bowl, warm water, sugar and dried yeast were mixed and set aside for 5-10 minutes until foaming. Flour, xanthan gum, baking powder and salt were sieved into a large bowl and mixed. Once the water and yeast mixture had foamed, the lemon juice, olive oil and eggs were added and whisked in a mixer at medium speed for 5 minutes. The mix was then transferred to a bread tin and placed in the centre of a pre-heated (200° C.) oven and baked for 50 minutes.

Replacement gf Bread Recipe 375 ml warm water; 3 tsp caster sugar; 2×7 g sachets dried yeast; 375 g gluten-free flour; 1 tsp xanthan gum; 4 tsp baking powder; ½ tsp sea salt; 1½ tsp lemon juice; 4 tbsp olive oil; 0.3% cellulose-containing particles.

Preparation: In a bowl, warm water, sugar and dried yeast were mixed and set aside for 5-10 minutes until foaming. Flour, xanthan gum, baking powder and salt were sieved into a large bowl and mixed. Once the water and yeast mixture had foamed, the lemon juice, olive oil and cellulose-containing particles were added and whisked in a mixer at medium speed for 5 minutes. The paste mixture was then transferred to a bread tin and placed in the centre of a pre-heated (200° C.) oven and baked for 50 minutes.

The gf bread of each of the replacement recipes containing the cellulose-containing particles of plant powder C, described above, rose significantly more than that of the control gf bread recipe. However, the appearance and texture of each gf bread were indistinguishable, other than the increased size in the gf bread of the replacement recipes. Removal of egg and reduction of starch in experimental bread had not altered appearance or texture.

The results of this Example 3 are substantially the same when the cellulose-containing particles of any of the other plant powders A, B or D is substituted for the plant powder C.

Example 4—Muffin Recipe Using Preferred Cellulose-Containing Particles A to D of Example 1

In the following replacement muffin recipes, fat and sugar were replaced, in part, with 0.2 wt % of cellulose-containing particles of plant powder C, described above, which can be used in the preferred replacement method of the present invention.

TABLE 1

Example 4: Recipees

| | Control | 20% Sugar Reduction | 30% Oil Reduction |
|---|---|---|---|
| Self raising Flour [g] | 250 | 250 | 250 |
| Caster Sugar [g] | 175 | 140 | 175 |
| Egg [g] | 90 (1 large egg) | 0 | 0 |
| Water [ml] | 250 | 373.22 | 365.22 |
| Vegetable Oil [g] | 90 | 90 | 63 |
| Cocoa powder [g] | 20 (2 tsp) | 20 | 20 |
| Vanilla extract [g] | 5 (1 tsp) | 5 | 5 |
| Baking powder [g] | 10 | 10 | 10 |
| Curran (100% active) | 0 | 1.78 (0.2%) | 1.78 (0.2%) |
| Totals [g] | 890 | 890 | 890 |

Preparation of each recipe: All dry ingredients were weighed out in mixer bowl. All the liquid ingredients were weighed and mixed in a separate bowl, then slowly added to and mixed with the dry ingredients in food a mixer for 5 minutes. Batter was then weighed out into individual cases at 75 g per case. The muffins were then cooked for 20 minutes in a preheated (200° C.) oven. After baking, the reduced sugar muffins rose more at the top and had improved appearance with a lighter colour than the full sugar muffins. The internal structure appeared similar between the reduced sugar muffins and the full sugar muffins, with each responding in the same way when pressure was applied to the centre of the muffin. After baking, the reduced oil muffins appeared to have the same colour and internal structure as the full oil muffins, with each responding in the same way when pressure was applied to the centre of the muffin.

The results of this Example 4 are substantially the same when the cellulose-containing particles of any of the other plant powders A, B or D is substituted for the plant powder C. Conclusions: The cellulose-containing particles appear to function well in muffin and to replicate the function of oil in the gluten free bread recipe.

The cellulose-containing particles appear promising for enabling the proportion of oil and sugar to be reduced in cake recipes by increasing the proportions of one or more other ingredients in the recipes.

Example 5: Bechamel Sauce

TABLE 1

Example 5: Recipes

| | Bechamel Control (g) | 50% fat reduced Bechamel (g) |
|---|---|---|
| Butter | 60 | 30 |
| Flour | 60 | 60 |
| Milk | 600 | 496.32 |
| Water | 0 | 129.36 |
| Curran (100% active) | 0 | 4.32 |

Butter was melted in a large saucepan over medium heat. Once melted, flour was stirred in until smooth for 7 minutes. Heat was increased to medium-high and the milk was whisked in until thickened by the roux. The roux was brought to a gentle simmer, then heat was reduced medium-low and stirring continued under simmering until the flour had softened (20 minutes).

Viscosity was measured as follows:

TABLE 2

| Example 5: Viscosity measurements | | |
|---|---|---|
| Bechamel sauce 60° C. | Control | Reduced Fat (0.6% Curran) |
| Spindle | RV14 | RV14 |
| Speed (140 rpm) | (Cps) | (Cps) |
| 1 min | 3267 | 2500 |
| 2 min | 3000 | 2383 |
| 3 min | 2785 | 2312 |

Both sauces had an identical mouth feel and consistency.

Example 6: Chocolate Sauce

TABLE 1

| Example 6: Recipes | | |
|---|---|---|
| Ingredient | Chocolate sauce Control (g) | Chocolate Sauce 50% reduced fat (g) |
| Chocolate | 50 | 50 |
| Butter | 25 | 12.5 |
| Double Cream | 125 | 71.25 |
| Sugar | 15 | 15 |
| Water | 0.00 | 64.91 |
| Curran (100% active) | 0.00 | 1.29 |

The dry ingredients (sugar, flour, Curran (as applicable) and cocoa powder) were mixed. Then a combination of warm butter ad double cream, or water, butter and double cream where whisked together, and the dry ingredients were added into the liquid mixture a little at a time under heating until the mixture came to a simmer, upon which it was stirred constantly, for about 6 minutes. Then the sauce was allowed to cool down.

Viscosity was measured as follows:

TABLE 2

| Example 6: Viscosity measurements | | |
|---|---|---|
| Chocolate Sauce 60° C. | Control | Reduced Hard Fat (0.6% Curran) |
| Spindle | RV14 | RV14 |
| Speed (140 rpm) | (Cps) | (Cps) |
| 1 min | 663 | 687 |
| 2 min | 455 | 607 |
| 3 min | 446 | 589 |

Both sauces had an identical mouth feel and consistency.

Example 7

TABLE 1

| Example 7: Recipes | | |
|---|---|---|
| Glace Icing | Control (g) | 12% Sugar reduction with 1.2% Curran added (g) |
| Icing Sugar | 125 | 110 |
| Warm water | 15 | 28.32 |
| Curran (100% active) | 0 | 1.68 |
| Total | 140 | 140 |

The icing sugar was sifted into a bowl and gradually the water was added at 40° C. until the icing became thick enough to coat the back of a spoon.

Both icings had an identical mouth feel and consistency.

Example 8

TABLE 1

| Example 8: Recipes | | |
|---|---|---|
| Caramel | Control (g) | 0.6% Curran with 50% butter reduction and 15% reduction in condensed milk |
| Condensed Milk | 397 | 335.95 |
| Golden Syrup | 30 | 30 |
| Caster Sugar | 60 | 60 |
| Butter | 120 | 60 |
| Curran (100% active) | 0 | 3.64 |
| Water | 0 | 117.41 |

Recipe: Sugar, butter, condensed milk, water and Curran (as appropriate) were mixed, and brought to a gentle boil and cooked until thickened (1 to 2 minutes), and the sauce was allowed to cool down.

Both sauces had an identical mouth feel and consistency.

The invention claimed is:

1. A food product comprising a substantially reduced proportion of egg materials and/or sugar, cellulose-containing particles, and an increased proportion of other ingredients of the food product, wherein the egg materials and/or sugar have at least in part been functionally replaced by the cellulose-containing particles, wherein the cellulose-containing particles are derived from an herbaceous plant, wherein the cellulose-containing particles have a mean major dimension of 1 to 250 μm, wherein the cellulose-containing particles have a water-holding capacity in the range of 90% to 99.5% by weight, wherein the cellulose-containing particles have a non-carbohydrate content of 20 to 50% by dry weight, and wherein the cellulose-containing particles are prepared from herbaceous plant material by a process, comprising the steps of:

(i) contacting the herbaceous plant material with water, and optionally, a peroxide reagent;

(ii) heating the mixture from step (i) to a temperature of from 30 to 110° C. and maintaining the mixture at a temperature of from 30 to 110° C. until the pH of the mixture has dropped by at least 2 pH units; and then (iii) isolating the cellulose-containing particles from the mixture of step (ii).

2. The food product of claim 1 wherein the cellulose-containing particles comprise less than 60 wt % cellulose and/or wherein the cellulose-containing particles comprise more than 50 wt % dietary fibres.

3. The food product of claim 1, wherein the cellulose-containing particles have a mean major dimension of 10 to 100 μm.

4. The food product of claim 1, wherein the cellulose-containing particles are made by comminuting the herbaceous plant material to form particles of the plant material having a mean major dimension of 1 to 250 μm.

5. The food product of claim 1, wherein the food product is substantially fat-free.

6. The food product of claim 1, wherein the food is mayonnaise dressing, a salad dressing, a custard, a dairy or non-dairy whipped frozen topping, a cream sauce, a cream-based soup, a frosting, a frozen dessert, a fruit-based bakery filling, a low moisture food products, including nut pastes including peanut butter, confectionery spreads including cookie fillings, chocolate sauce, caramel sauce and other confectionery coatings, confectionery fillings or spreads including nougat, caramel, truffle, fudges; confectionery and bakery icings and glazes, creme fillings, snack spreads and fillings; dairy products, milk based products or substitutes therefore, including cream substitutes, stabilized forms of steamed milk or substitutes therefore, frozen snacks including ice cream, frozen yogurt, soft-serve or hard-packed frozen desserts, ice milk, butter, margarine, sour cream, yogurt; salad dressings; and cream or soups and sauces including custards; a bakery product; and/or a bakery pre-baking product including a leavened dough or batter.

* * * * *